United States Patent [19]

Barten et al.

[11] 4,383,838
[45] May 17, 1983

[54] PROCESS AND APPARATUS FOR CLEANING SOLVENT-CONTAINING EXHAUST AIR

[76] Inventors: Ernst-Heinrich Barten, Listertalstrasse 73, D-5952 Attendorn 13; Gunther Lukaschek, Dirkenshof 6a, D-2105 Seevetal 2, both of Fed. Rep. of Germany

[21] Appl. No.: 331,879

[22] Filed: Dec. 17, 1981

[30] Foreign Application Priority Data

Dec. 18, 1980 [DE] Fed. Rep. of Germany ....... 3047658

[51] Int. Cl.³ ............................................ B01D 53/18
[52] U.S. Cl. ......................................... 55/48; 55/89; 55/228
[58] Field of Search ................. 55/30, 31, 36, 38, 85, 55/89, 93, 94, 228, 229, 233, 48

[56] References Cited

U.S. PATENT DOCUMENTS

| | | | |
|---|---|---|---|
| 2,993,566 | 7/1961 | Gaiffin | 55/31 |
| 3,492,788 | 2/1970 | Hochgesand et al. | 55/48 |
| 3,745,746 | 7/1973 | Psymas | 55/31 |
| 4,101,297 | 7/1978 | Uda | 55/48 X |
| 4,261,707 | 4/1981 | Bradshaw et al. | 55/85 X |
| 4,302,220 | 11/1981 | Volkamer et al. | 55/32 |

*Primary Examiner*—John Adee
*Attorney, Agent, or Firm*—Young & Thompson

[57] ABSTRACT

Solvent-containing exhaust air is cleaned and the solvent is recovered in a two-stage scrubbing process, in which the first stage comprises (a) scrubbing solvent-containing exhaust air in countercurrent with a first liquid scrubbing medium conducted in a closed cycle;
(b) separating solvent from the first scrubbing medium into separate liquid phases by distillation;
(c) recycling the thus-recovered first scrubbing medium to the scrubbing process; and
(d) collecting the solvent for reuse; and in which the second stage comprises
(e) scrubbing the exhaust air discharged from the first stage and loaded with residual components of the first scrubbing medium in countercurrent with a second scrubbing medium conducted in a closed cycle, the second scrubbing medium having a low vapor pressure to avoid scrubbing medium losses during the scrubbing and exhausting of the cleaned exhaust air;
(f) degasifying the mixture of second scrubbing medium and residual first scrubbing medium;
(g) separating the first and second scrubbing media into separate liquid phases by distillation under vacuum; and
(h) recycling the first scrubbing medium to the scrubbing process of the first stage, and recycling the second scrubbing medium to the scrubbing process of the second stage, the first scrubbing medium being an organic liquid, e.g. N-methylpyrrolidone, and the second scrubbing medium being a mineral oil the vapor pressure of which is substantially less than that of said organic liquid and the viscosity of which is higher than that of said organic liquid and having a boiling range of 3.g. 300°–500° C.

8 Claims, 1 Drawing Figure

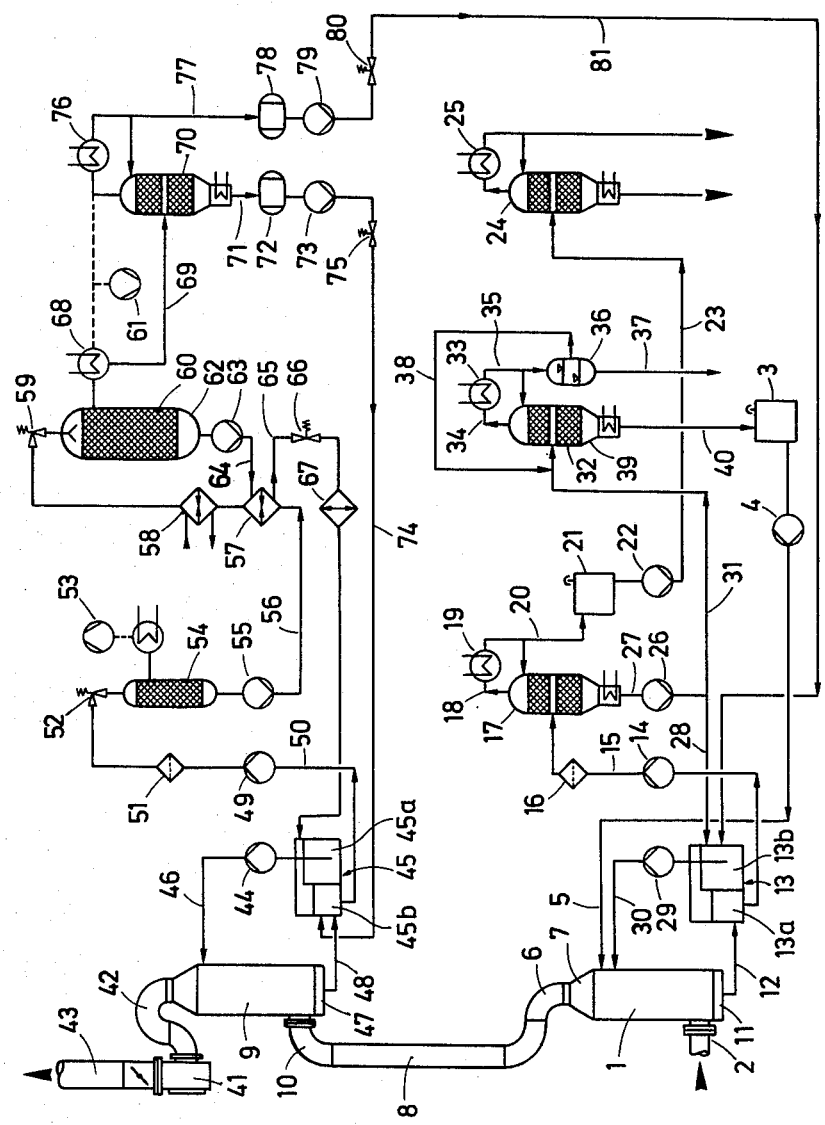

PROCESS AND APPARATUS FOR CLEANING SOLVENT-CONTAINING EXHAUST AIR

The invention relates to a process and apparatus for cleaning solvent-containing exhaust air and the recovery of the solvent or solvents.

The exhaust air produced, for example, in strip coating, varnishing enameling or painting installations contains solvent components in the form of droplets and vapor with a concentration not permissible according to emission control laws. It is necessary because of the legal regulations to subject the solvent-containing exhaust air to purification by means of which the content of those solvents which are classified as harmful substances in accordance with the emission control laws is reduced at least to the maximum permissible values as prescribed by law.

Various scrubbing processes are known for the cleaning of exhaust air.

In a process for cleaning the oil-containing waste air produced in the operation of rolling mills, as disclosed in German Pat. No. 2,451,157, this waste air is scrubbed in a countercurrent operation with a scrubbing oil circulated in a closed cycle; and this scrubbing oil is subjected, after the scrubbing process, to vacuum distillation during which the rolling oil is removed from the scrubbing oil. The thus-recovered rolling oil is recycled to the production stage, and the scrubbing oil, separated by distillation, is reused for the scrubbing process. By means of this procedure, hydrocarbons can be scrubbed out of the waste air, but the process cannot be used for solvents of a polar or nonpolar type entering the air, for example, in varnishing installations.

The process described in German Published Application (DAS) No. 1,282,606 for the recovery of cyclohexane from exhaust air is likewise unsuitable for cleaning the exhaust air of solvents. DAS No. 1,282,606 discloses an exhaust air cleaning method wherein hydrocarbons, especialy cyclohexane, occurring in a relatively high concentration in gases and/or exhaust air are separated by means of a scrubbing oil and recovered from the latter by distillation. The thus-purified exhaust air, after passing through the scrubber, still contains such high proportions of hydrocarbons that it can be exhausted into the environment only after a special purification procedure, namely after combustion of the harmful substances.

Finally, German Pat. No. 2,511,181 describes a process for the cleaning of exhaust air loaded with organic compounds in the form of solvents, wherein the solvents are removed from the exhaust air by means of liquid spindle oil or, when processing protective floor sealing compounds, by a plasticizer for the latter. In this process the scrubbing agent is conducted in a closed cycle through a scrubber until the absorption capacity of the solvent has been exhausted. The results attained with this process do not satisfy the environmental protection requirements, inasmuch as a relatively high proportion of solvents remains in the exhaust air after the cleaning step.

The invention has for its object the provision of a process for the cleaning of solvent-containing exhaust air with which the degree of purity of the exhaust air, required by the emission control laws, is attained with an economically feasible expenditure. Another object is the provision of an installation for conducting the process.

According to the invention, these objects are achieved by a process and apparatus for the cleaning of solvent-containing exhaust air and recovery of the solvents, characterized by a two-stage scrubbing process with the following process steps in the first stage:
  (a) scrubbing of the exhaust air in countercurrent by means of a first liquid scrubbing medium conducted in a closed cycle;
  (b) recovery of the solvents and of the first scrubbing medium in separate liquid phases by means of one or several distillation and/or rectification processes (hereinafter called distillation);
  (c) recycling of the thus-recovered first scrubbing medium into the scrubbing process; and
  (d) discharging the solvents for reuse into collecting tanks;
and characterized by the following process steps in the second stage:
  (e) scrubbing of the exhaust air discharged from the first stage and loaded with residual components of the first scrubbing medium and, in some cases, the solvents, in countercurrent by means of a second scrubbing medium conducted in a closed cycle, with a correspondingly low vapor pressure to avoid scrubbing medium losses during the scrubbing and exhausting of the cleaned exhaust air;
  (f) degasification of the mixture of second scrubbing medium and residual proportion of first scrubbing medium;
  (g) recovery of the first and second scrubbing media in separate liquid phase by distillation and rectification under vacuum; and
  (h) recycling of the first scrubbing medium into the scrubbing process of the first stage, and of the second scrubbing medium into the scrubbing process of the second stage,
wherein, as the first scrubbing medium, an organic liquid is employed, preferably N-methylpyrrolidone (NMP), and, as the second scrubbing medium, a mineral oil is utilized, the vapor pressure of which lies markedly below that of the NMP, and the viscosity of which is higher than that of the NMP.

According to another feature of the invention, the rectifying process of the first stage is conducted with an auxiliary rectifying agent.

An important feature of the invention, finally, is that this invention can also be utilized for the cleaning of plasticizer-containing exhaust air.

The invention will be explained in detail below with reference to an example, illustrated schematically in the drawing, which is the flow diagram of an installation for the cleaning of solvent-containing exhaust air and recovery of the solvents.

Referring now to the drawing in greater detail, the exhaust air to be cleaned, which has been removed, for example, by suction from a varnishing plant and carries an unduly high concentration of solvents, is conducted, in the first scrubbing stage of the installation, via an inlet conduit 2 to the lower zone of a first gas scrubber 1. The scrubber 1 is charged from the top with a first pure scrubbing liquid, e.g. N-methylpyrrolidone (NMP), withdrawn from the storage tank 3 by means of a pump 4 and fed into the top of the scrubber via feed line 5. The exhaust air scrubber 1 can be constructed, for example, as a plate-type scrubber, packing-filled scrubber, or spray-type scrubber. In the aforementioned gas scrubbers, the feed line 5 for the first scrubbing medium introduced in the pure form enters the scrubber above the uppermost plate and/or packing element. The solvent-containing exhaust air rising in the first scrubber is brought countercurrently into intimate contact with the first scrubbing medium with a boiling point of about 200° C. passing through the scrubber 1 from the top toward the bottom, this absorbing the solvent or solvent mixture from the exhaust air. Due to the relatively high vapor pressure of the first scrubbing medium in dependence on the respective operating temperature, the exhaust air leaving the first scrubber via the outlet conduit 6 in the dome 7 thereof and entering, via the connecting conduit 8 as well as the inlet conduit 10, the lower region of the second scrubber 9, contains a corresponding proportion of NMP.

The mixture of first scrubbing medium and solvent is collected in the sump 11 of the scrubber 1, flows via the conduit 12 into the chamber 13a of the two-chamber storage tank 13, and is conveyed by the pump 14 through the conduit 15 by way of the filter 16 into the distillation unit 17. The filter 16 serves for removing solids from the exhaust air, which solids were entrained in the varnishing plant and separated in the scrubber 1.

In the distillation unit 17, a preliminary separation is effected under atmospheric pressure. During this step, the lower-boiling components of the solvent are obtained as head products and the higher-boiling solvent components as well as the first scrubbing medium are obtained as the sump product.

The solvent vapors flow from the upper zone of the distillation unit 17 via the feed line 18 into the condenser 19 and are condensed therein. From condenser 19, the liquid, lower-boiling solvent mixture passes via the conduit 20 into the storage tank 21 and is conducted from the latter, by means of the pump 22, via the connecting conduit 23 into the rectifying column 24 in order to separate the desired solvent fractions. These solvent fractions, after liquefaction in one or several condensers 25 connected downstream of the rectifying column 24, are fed to storage tanks for reuse in the varnishing plant.

The liquid sump product made up of first scrubbing medium and higher-boiling solvent components, obtained in the distillation unit 17, is withdrawn by means of pump 26 via the conduit 27 and divided into two partial streams. One partial stream is impelled by pump 26 via the branch conduit 28 into the chamber 13b of the two-chamber tank 13, and from there is pumped by means of pump 29 through the feed line 30 into the upper region of the scrubber 1. The feed line 30 for the mixture of first scrubbing medium and higher-boiling solvent components enters the scrubber 1 below the feed line 5, which latter conducts the first scrubbing medium in the pure form.

The other partial stream is impelled by the pump 26 via the branch conduit 31 into the rectifying column 32 and separated under the effect of an auxiliary rectifying agent under atmospheric pressure into pure, liquid first scrubbing medium, and a mixture of higher-boiling solvent components and auxiliary rectifying agent, which is obtained in vapor phase and is liquefied by the condenser 33 connected via conduit 34 with rectifying column 32. The liquid mixture passes via the conduit 35 into the separator 36, fashioned, for example, as a gravity separator, wherein the higher-boiling solvent components are withdrawn via conduit 37 and fed for reuse into storage tanks, and the thus-separated auxiliary rectifying agent is introduced via the return conduit 38 into the branch conduit 31 leading into the rectifying column 32 in a recycling operation.

Pure first scrubbing medium is obtained in liquid phase in the sump 39 of the rectifying column 32. This scrubbing medium passes via conduit 40 into the storage tank 3 and is recycled from the latter by means of the pump 4 through the feed line 5 in a closed cycle into the scrubber 1 for the scrubbing process.

The exhaust air, containing a small proportion of the first scrubbing medium NMP, passes from the first scrubber via the connecting conduit 8 into the scrubber 9 of the second scrubbing stage of the installation, and rises through the scrubber 9 countercurrently to a second scrubbing medium. The second scrubbing medium is a mineral oil having a relatively low vapor pressure; this oil, in intimate contact with the NMP-containing exhaust air, absorbs the NMP and dissolves same and, due to its low vapor pressure, is not vaporized so that no oil vapors enter the exhaust air. The thus-purified exhaust air is withdrawn by means of a fan 41 via the pipe elbow 42 from the second scrubber 9 and exhausted through a flue 43.

The mineral oil selected as the second scrubbing agent, having a boiling range of about 300°–500° C., is conducted by means of pump 44 from the chamber 45a of the two-chamber tank 45 via conduit 46 into the upper zone of the second exhaust air scrubber 9 and, during passage through the scrubber, absorbs the first scrubbing medium NMP from the countercurrently rising exhaust air. The NMP-containing oil is collected in the sump 47 of the scrubber and flows via conduit 48 into the chamber 45b of the two-chamber container 45. The NMP-containing oil accumulated in the chamber 45b is forced by means of the pump 49 through the connecting conduit 50 via a filter 51 against a pressure valve 52 into the preliminary vacuum degasifier 54 operated by means of a vacuum pump 53. In this degasifier, the oil is freed of the air absorbed during the scrubbing step as well as of part of any water which may be present. Solid impurities are held back by means of the filter 51.

The thus-degasified oil is withdrawn from the preliminary degasifier 54 by means of pump 55 and conducted through conduit 56 via a heat exchanger 57 as well as a heating unit 58 against a pressure valve 59 into the vacuum distillation tank 60, wherein the vacuum is produced by vacuum pump 61.

In the sump 62 of the vacuum distillation tank 60, pure oil is obtained which is returned to the chamber 45a of the two-chamber tank 45 in a closed cycle by means of the pump 63 via conduit 64 and the heat exchanger 57, to heat up the NMP-containing oil coming from the preliminary vacuum degasifier 54 and passing through the heat exchanger countercurrently to the oil, as well as via conduit 65 against a pressure valve 66 and by way of a cooler 67.

The NMP vapors, in some cases with impurities occurring as oil vapors, obtained in the vacuum distillation tank 60 as the heat product, are liquefied in condenser 68, and the condensate is fed via conduit 69 to a subsequently connected rectifying column 70 for processing under vacuum.

The liquid sump product accumulated in the rectifying column 70 passes via conduit 71 into the storage tank 72 and is returned from there by means of pump 73 via conduit 74 against the pressure valve 75 to the chamber 45b of the two-chamber tank 45.

Pure NMP in vapor phase is obtained as the head product in the rectifying column 70. After liquefaction in condenser 76, this NMP passes via conduit 7 into the storage tank 78 and is returned from there by means of the pump 79 against the pressure valve 80 via the return conduit 81 to the chamber 13b of the two-chamber tank 13 for reuse in the scrubbing operation of the first scrubbing stage of the installation.

The rectification unit located downstream of the vacuum distillation of the second scrubbing stage prevents any oil from passing together with the recovered NMP into the first scrubbing stage of the installation.

By means of the above-described, two-stage scrubbing process, exhaust air from varnishing plants and similar production installations, containing solvents of a polar and nonpolar type, can be purified with an economically feasible expenditure down to the permissible pollutant concentration prescribed by law. The economy of an installation operating according to the novel scrubbing method is ensured by the separate recovery of the individual solvent components and the scrubbing media employed, which can be reused. The novel cleaning process makes it unnecessary to utilize expensive subsequent processes for processing the deleterious substances separated from the exhaust air.

The aforedescribed scrubbing process is insensitive to paint particles, droplets, and solids contained in the exhaust air. These are removed in accordance with the permissible pollutant concentrations from the exhaust air and separated by means of filtering.

The control of the cleaning installation does not offer any substantial difficulties, since the installation, on the basis of the two-stage scrubbing procedure with two different scrubbing media, as utilized herein, operates independently of the instantaneous, ambient concentration of deleterious substances.

By means of the novel process, even very large amounts of exhaust air can be processed with pollutant concentrations lying only slightly above the values prescribed by emission protection laws.

N-Methylpyrrolidone, utilized as the first scrubbing medium, is nontoxic and possesses an excellent dissolving capacity for many technical solvents.

From a consideration of the foregoing disclosure, therefore, it will be evident that the initially recited objects of the invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Process for the cleaning of solvent-containing exhaust air and recovery of the solvent in a two-stage scrubbing process, in which the first stage comprises
    (a) scrubbing solvent-containing exhaust air in countercurrent with a first liquid scrubbing medium conducted in a closed cycle;
    (b) separating solvent from the first scrubbing medium into separate liquid phases by distillation;
    (c) recycling the thus-recovered first scrubbing medium to the scrubbing process; and
    (d) discharging the solvent for reuse into collecting means;
and in which the second stage comprises
    (e) scrubbing the exhaust air discharged from the first stage and loaded with residual components of the first scrubbing medium in countercurrent with a second scrubbing medium conducted in a closed cycle, said second scrubbing medium having a low vapor pressure to avoid scrubbing medium losses during the scrubbing and exhausting of the cleaned exhaust air;
    (f) degasifying the mixture of second scrubbing medium and residual first scrubbing medium;
    (g) separating the first and second scrubbing media into separate liquid phases by distillation under vacuum; and
    (h) recycling the first scrubbing medium to the scrubbing process of the first stage, and recycling the second scrubbing medium to the scrubbing process of the second stage.

2. Process as claimed in claim 1, the first scrubbing medium being an organic liquid and the second scrubbing medium being a mineral oil the vapor pressure of which is substantially less than that of said organic liquid and the viscosity of which is higher than that of said organic liquid.

3. Process as claimed in claim 1, in which said first scrubbing medium has a boiling point of about 200° C.

4. Process as claimed in claim 1, in which said first liquid scrubbing medium is N-methylpyrrolidone.

5. Process as claimed in claim 1, in which said second scrubbing medium is a mineral oil having a boiling range of about 300°–500° C.

6. Apparatus for the cleaning of solvent-containing exhaust air and recovery of the solvent in two stages, in which the first stage comprises
    (a) means for scrubbing solvent-containing exhaust air in countercurrent with a first liquid scrubbing medium conducted in a closed cycle;
    (b) means for separating solvent from the first scrubbing medium into separate liquid phases by distillation;
    (c) means for recycling the thus-recovered first scrubbing medium to the scrubbing process; and
    (d) means for discharging the solvent for reuse into collecting means;
and in which the second stage comprises
    (e) means for scrubbing the exhaust air discharged from the first stage and loaded with residual components of the first scrubbing medium in countercurrent with a second scrubbing medium conducted in a closed cycle, said second scrubbing medium having a low vapor pressure to avoid scrubbing medium losses during the scrubbing and exhausting of the cleaned exhaust air;
    (f) means for degasifying the mixture of second scrubbing medium and residual first scrubbing medium;
    (g) means for separating the first and second scrubbing media into separate liquid phases by distillation under vacuum; and
    (h) means for recycling the first scrubbing medium to the scrubbing process of the first stage, and for recycling the second scrubbing medium to the scrubbing process of the second stage.

7. Apparatus as claimed in claim 6, in which the first-mentioned separating means comprises plural distillation stages in series with each other.

8. Apparatus as claimed in claim 6, in which the last-mentioned separating means comprises plural vacuum stills in series with each other.

* * * * *